United States Patent
Hillukka et al.

(10) Patent No.: US 10,780,543 B2
(45) Date of Patent: Sep. 22, 2020

(54) MODULAR ZERO BACKLASH DEFAULT TO LOCK BRAKE/LOCKING APPARATUS

(71) Applicant: Nexen Group, Inc., Vadnais Heights, MN (US)

(72) Inventors: Justin William Hillukka, Otsego, MN (US); Anthony Will Kliber, Andover, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 0 days.

(21) Appl. No.: 16/335,303

(22) PCT Filed: Sep. 22, 2017

(86) PCT No.: PCT/US2017/052900
§ 371 (c)(1),
(2) Date: Mar. 21, 2019

(87) PCT Pub. No.: WO2018/057853
PCT Pub. Date: Mar. 29, 2018

(65) Prior Publication Data
US 2020/0016713 A1    Jan. 16, 2020

Related U.S. Application Data

(60) Provisional application No. 62/398,011, filed on Sep. 22, 2016.

(51) Int. Cl.
*B23Q 16/10* (2006.01)
*F16D 51/02* (2006.01)
(Continued)

(52) U.S. Cl.
CPC ............ *B23Q 16/10* (2013.01); *F16D 51/02* (2013.01); *F16D 59/02* (2013.01); *F16D 71/00* (2013.01);
(Continued)

(58) Field of Classification Search
CPC .... B23Q 16/10; B23Q 16/105; B23Q 16/107; F16D 51/02; F16D 59/02
(Continued)

(56) References Cited

U.S. PATENT DOCUMENTS

| 6,457,383 B1 * | 10/2002 | Kschier ................... B23Q 1/28 409/220 |
| 2010/0199804 A1 * | 8/2010 | Tatsuda ................ B23Q 16/102 74/813 L |

FOREIGN PATENT DOCUMENTS

| DE | 10222101 A1 | 11/2003 |
| DE | 102012004467 A1 | 9/2013 |

* cited by examiner

*Primary Examiner* — Thomas C Diaz
(74) *Attorney, Agent, or Firm* — Alan D. Kamrath; Mayer & Williams PC

(57) ABSTRACT

An apparatus (B) controls rotation of an annular member (36) relative to top and bottom housings (12, 10). The bottom housing (10) includes a disk (110) extending radially and terminating in a cylindrical portion (112) having circumferentially spaced slits (212). A wedge (16) abuts with the cylindrical portion (112) and is moved radially between first and second positions by an axially moveable piston (14), with the wedge including an angle surface (340) which interfaces with an angled surface (520) of the piston (14) through a plurality of balls (18). The disk (110) and the cylindrical portion (112) are formed as a single component of material having sufficient material strength and yield to allow engagement and disengagement of the cylindrical portion (112) with the annular member (36). The wedge (16) is slideable between an axial surface (250) of the disk (110) and a guiding flange (450) of the top housing (12).

20 Claims, 3 Drawing Sheets

(51) Int. Cl.
*F16D 59/02* (2006.01)
*F16D 71/00* (2006.01)
*F16D 121/06* (2012.01)
*F16D 125/66* (2012.01)

(52) U.S. Cl.
CPC .... *B23Q 2220/004* (2013.01); *F16D 2121/06* (2013.01); *F16D 2125/66* (2013.01)

(58) Field of Classification Search
USPC ...................................................... 74/813 L
See application file for complete search history.

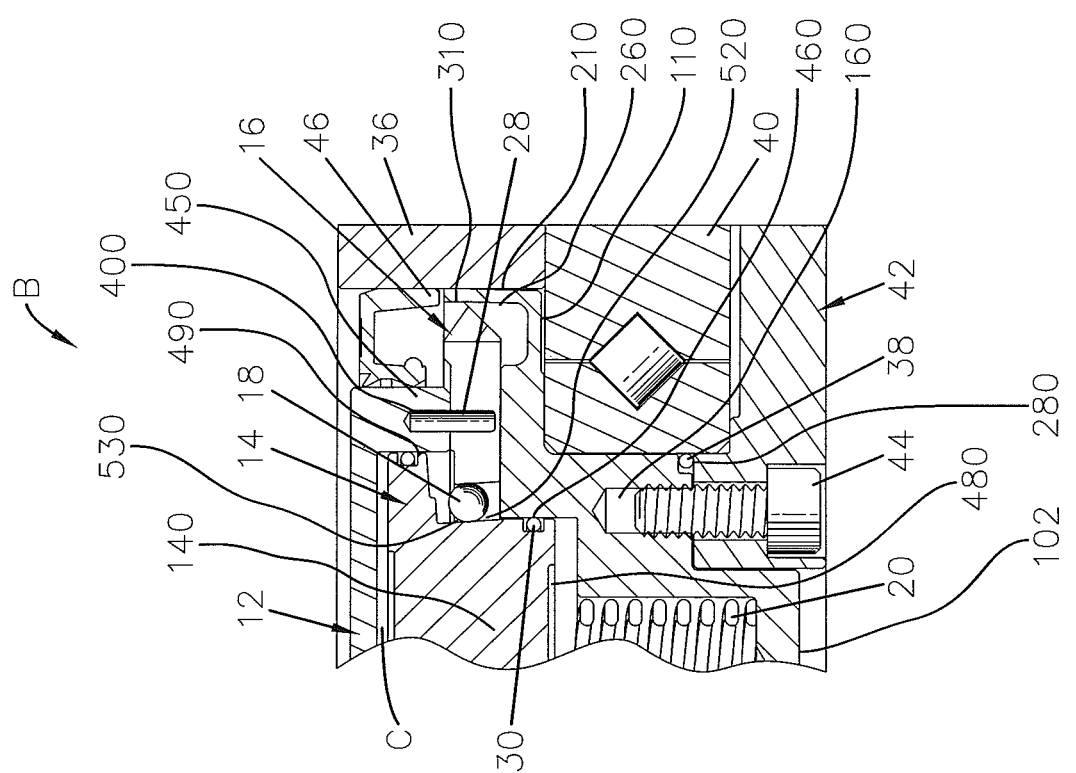

MODULAR ZERO BACKLASH DEFAULT TO LOCK BRAKE/LOCKING APPARATUS

BACKGROUND

A motion control apparatus, particularly, a rotary motion control apparatus, and, specifically, a modular zero backlash default to lock brake/locking apparatus is shown and described.

In the field of motion control, there is a continuing need for motion control apparatus which are zero backlash and which default to lock in function, providing locking and/or braking of a rotary system.

SUMMARY

This need and other problems in the field of motion control apparatus are solved by providing a modular zero backlash default to lock brake/locking apparatus. Specifically, in an apparatus for controlling rotation, a wedge abuts with a radially internal diameter of a cylindrical portion and is movable between a first position and a second position radially outward of the first position. The cylindrical portion integrally extends axially from the terminating end of a radially extending disk, with circumferentially spaced slits extending radially between a radially outward cylindrical friction surface and a radially inward internal diameter of the cylindrical portion and extending radially into the disk. An annular member includes an internal friction facing rotatable relative to and radially outwardly of the friction surface of the cylindrical portion. The disk and the cylindrical portion are formed as a single fixed component from a same material having sufficient material strength and yield to allow deflection of the cylindrical portion to engage the friction surface and face to hold the annular member from rotating relative to the cylindrical portion when the wedge is in the second position and to return the cylindrical portion to disengage from the annular member when the wedge is in the first position.

In illustrated aspects, an actuator, in the form of a piston, is moveable in an axial direction relative to the wedge and has an actuation surface which is not parallel to the axial direction. The end of the wedge opposite to the cylindrical portion includes an angled surface which is not parallel to the axial direction and which interfaces with the actuation surface for radially moving the wedge with axial movement of the actuator. A plurality of balls is provided between the angled and actuation surfaces to reduce friction.

In further illustrated aspects, the wedge slideably abuts with an axial surface of the disk and an axial guiding flange of a top housing. A dowel pin extends axially from the axial guiding flange and into a radially extending slot located between circumferentially spaced pieces forming the wedge. A rotary seal extends between the top housing and the annular member. The actuator includes a radially extending annular portion which is in sealing engagement with the axial guiding flange to define a pressure chamber. Compression springs are sandwiched between the actuator and a bottom housing including the cylindrical portion and the disk. The annular member is rotatable relative to the bottom housing by a bearing sandwiched by a stationary element secured to the bottom housing.

It is an objective to provide a novel apparatus for rotational motion control.

It is further an objective to provide a novel rotational motion control apparatus which utilizes novel features in one member to achieve true zero backlash.

It is further an objective to provide a novel rotational motion control apparatus which further utilizes novel features in one member to make use of the material strength or yield as a spring for a return mechanism.

It is further an objective to provide a novel rotational motion control apparatus defaulting to lock in power loss situations.

It is further an objective to provide a novel rotational motion control apparatus applying minimal axial force while engaged.

It is further an objective to provide a novel rotational motion control apparatus incorporating radial compliance such that the apparatus self-centers in the rotational member to ensure maximum torque.

It is further an objective to provide a novel rotational motion control apparatus which is modular for differing torque amplitudes, sizes, and applications.

It is further an objective to provide a novel rotational motion control apparatus having a modular method of engagement default to lock via being mechanically engaged, pneumatically engaged, or hydraulically engaged.

It is further an objective to provide a novel rotational motion control apparatus which is fully sealed from the operating environment.

Illustrative embodiments will become clearer in light of the following detailed description in connection with the drawings.

DESCRIPTION OF THE DRAWINGS

The illustrative embodiments may best be described by reference in the accompanying drawings where:

FIG. 3 is a partial, cross sectional view of the rotational control apparatus of FIG. 1 in an engaged position.

Figure 1:
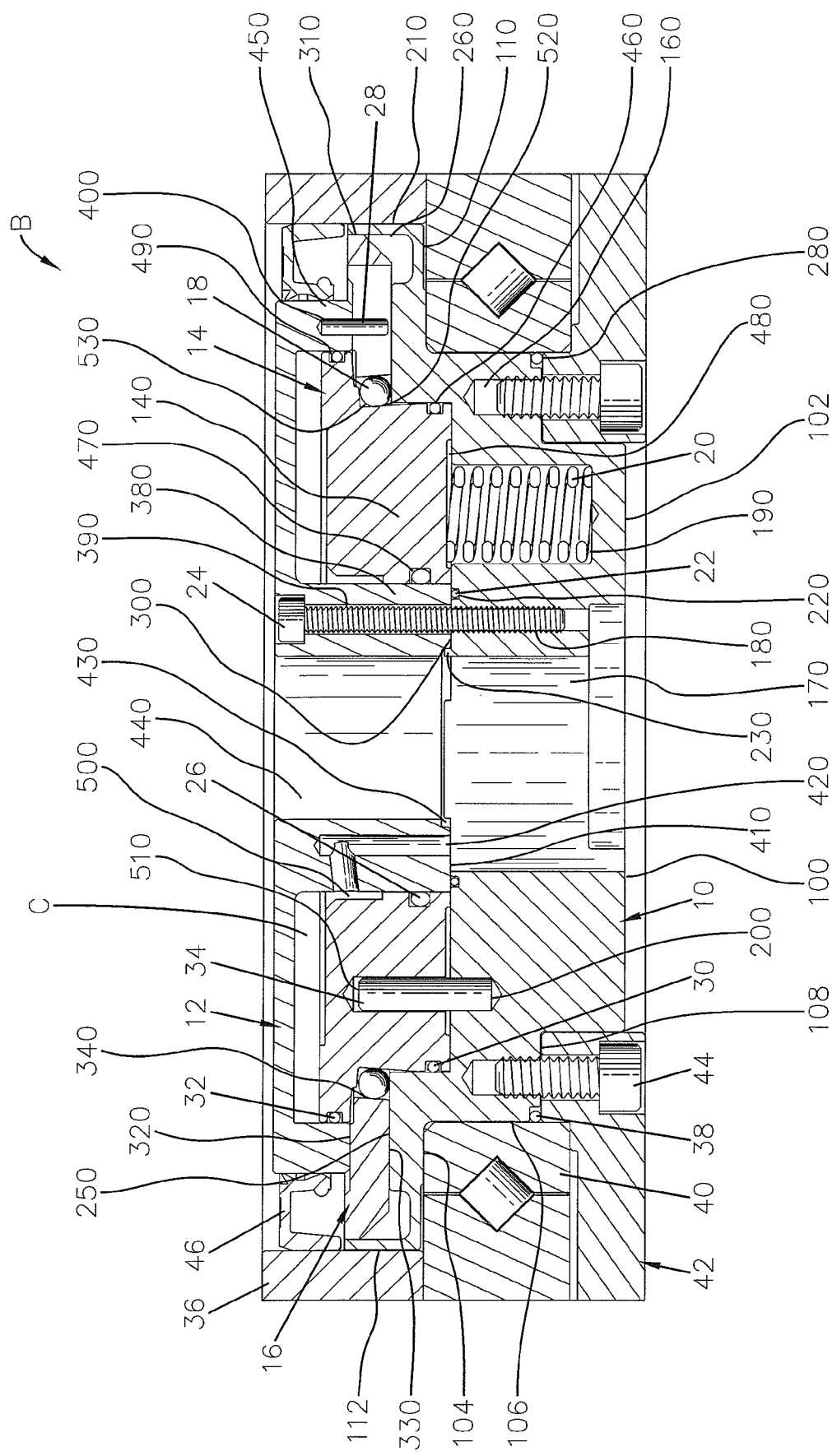
FIG. 1 is a cross sectional view of a rotational control apparatus in a disengaged position.
Figure 2:
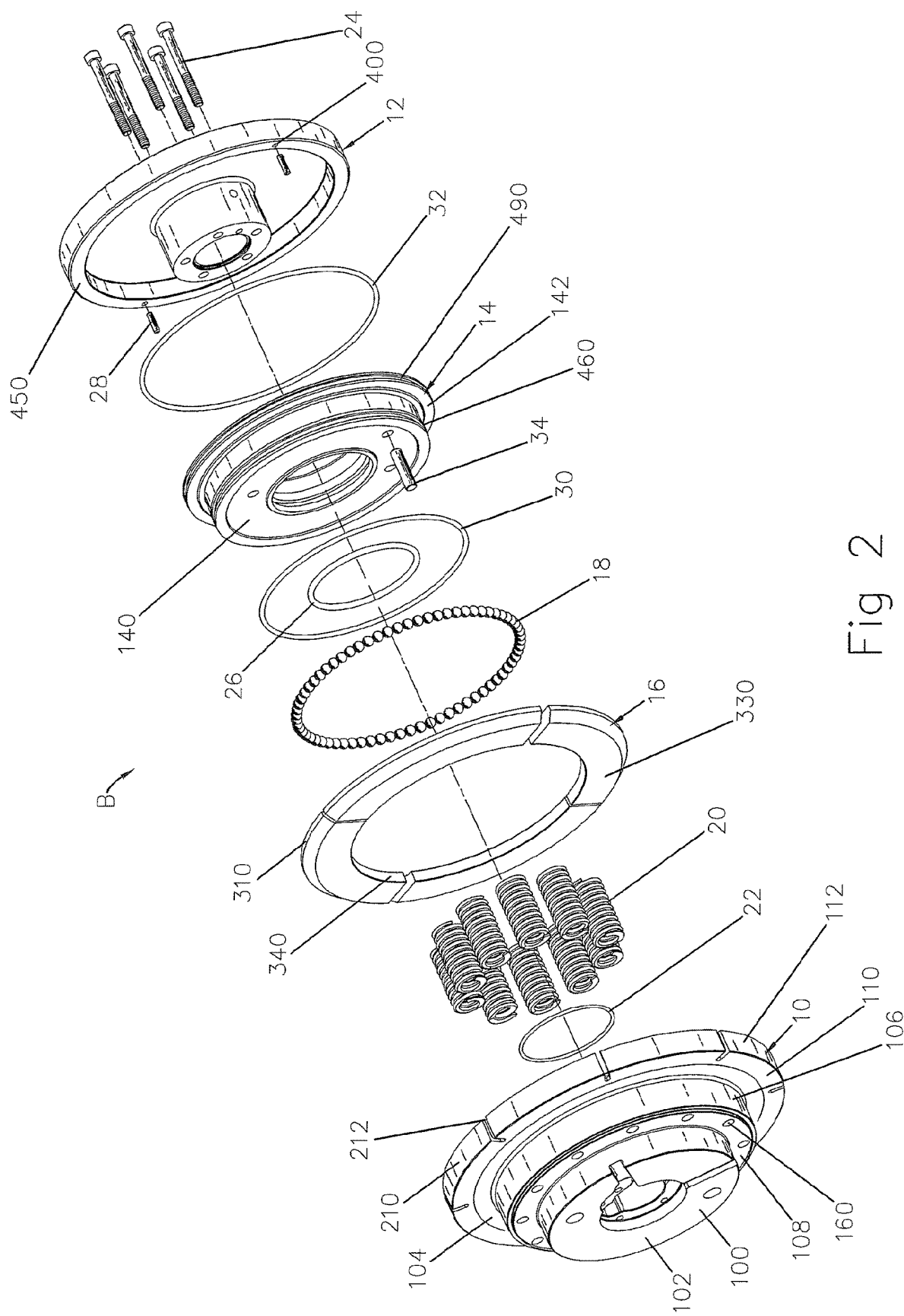
FIG. 2 is an exploded perspective view of the rotational control apparatus of FIG. 1.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

An apparatus for controlling motion shown in the form as a brake for stopping rotary movement is shown in the drawings and generally designated B. As illustrated in FIG. 1, brake B generally includes a bottom housing 10 and a top housing 12 to contain the internal mechanisms of brake B.

Bottom housing 10 and top housing 12 are shown in one form, but the size and shape of these components are subject to change per constraints of the application. Those skilled in the art will recognize that bottom housing 10 and top housing 12 may be constructed from any suitable material able to maintain the dimensional stability under the forces and stresses of braking.

Bottom housing 10 has features that allow for zero backlash operation. Generally, bottom housing 10 includes a central hub 100 having a first axial face 102 and a second axial face 104 spaced axially and radially from each other. A ring 106 is axially co-extensive with second axial face 104 but spaced from first axial face 102. An annular shoulder 108 is located between ring 106 and first axial face 102.

Bottom housing 10 is secured to a stationary element 42 by screws 44 threading into tapped holes 160 of bottom housing 10 and captures a bearing 40. Specifically, stationary element 42 has L-shaped cross sections having a first axially extending leg abutting with shoulder 108 and through which screws 44 extend and having a second radially extending leg. The first race of bearing 40 is sandwiched between the second radially extending leg and second axial face 104 and abuts with ring 106.

Bottom housing 10 also functions as the friction facing by deflecting and exerting a normal force from a friction surface 210 on a rotating member 36. Rotating member 36 is annular and is suitably secured to the second race of bearing 40 to be rotatable relative to bottom housing 10 and stationary element 42. In the form shown, bottom housing 10 includes a disk 110 integrally extending radially outwardly and terminating in a cylindrical portion 112 integrally extending axially therefrom. Circumferentially spaced slits 212 extend radially through cylindrical portion 112 and disk 110. Friction surface 210 is the radially outward surface of cylindrical portion 112. Disk 110 is axially spaced from the second race of bearing 40. The normal force exerted on rotating member 36, by bottom housing 10, causes friction between the two surfaces. This friction creates the braking torque of brake B. Zero backlash of brake B is achieved by friction surface 210 being directly grounded to stationary element 42.

Compression springs 20 actuate brake B by applying force to a surface 480 of a piston 14 which acts as an actuator moveable in an axial direction relative to bottom housing 10 and wedge 16. Bottom housing 10 contains spring pockets 190 to allow brake B to incorporate compression springs 20. Compression springs 20 actuate piston 14 moving it axially, engaging a wedge angle surface 520 with balls 18, which in turn roll on a third axial surface 250 opposite to second axial face 104 to engage with a wedge angle surface 340 on a wedge 16 slideable on third axial surface 250. Angle surfaces 340 and 520 are not parallel to the axial movement direction of piston 14.

Bottom housing 10 generally houses wedge 16. An outer clamping surface 310 of wedge 16 extends radially to abut against an internal diameter 260 of cylindrical portion 112 of bottom housing 10 to deflect friction surface 210, to make contact with rotating member 36. Those skilled in the art will recognize that wedge 16 may be in any number of pieces, including a one piece ring, without deviating from the scope of the invention. Also, it should be recognized that a reason to split wedge 16 into multiple pieces, or modify a one piece ring, is to reduce the hoop stress inherent in a circular part.

Wedge 16 has wedge angle surface 340 on the internal diameter that the actuation force of brake B is transmitted and controlled through. Those skilled in the art will realize that wedge angle surface 340 transmits the actuation force with a mechanical advantage, as well as changing the direction of the force. Those skilled in the art will also realize that wedge angle surface 340 may be at any angle.

Suitable provisions are provided to restrict the motion of wedge 16. A surface 330 of wedge 16 slides on bottom housing 10, and more specifically, on third axial surface 250 thereof. The axial force transferred to wedge 16 is transferred into top housing 12 through sliding a surface 320 of wedge 16 against a guiding flange 450 of top housing 12. This restricts axial motion from transferring to the output.

Suitable provisions are provided for anti-rotation of wedge 16. As shown, generally the anti-rotation of wedge 16 is performed by two dowel pins 28 at 180 degrees press fit into top housing 12 in holes 400 and slideably received in radially extending slots formed in wedge 16 such as located between adjacent circumferential spaced pieces forming wedge 16. Those skilled in the art will recognize that the design will not deviate from the spirit or scope of the invention if anti-rotation provisions are not used.

Suitable provisions are provided to reduce the friction or efficiency loss in the transmission of force between piston 14 and wedge 16. Those skilled in the art will recognize that if piston 14 and wedge 16 slide along each other, the actuation force would be lost to friction between the two parts. As shown, balls 18 are used to transmit the force between piston 14 and wedge 16. Balls 18 roll along the two parts when piston 14 is actuated by the actuation force. It is generally accepted that the resistance to motion is generally lower if elements roll rather than slide due to friction. While rolling elements in the form of balls 18 are used to transmit the force through wedge angle surfaces 520 and 340 of piston 14 and wedge 16, it can be recognized that the interface between piston 14 and wedge 16 does not have to be rolling.

Suitable provisions are provided to return balls 18 to a disengaged state. Piston 14 includes a ball return feature 530 to ensure that balls 18 all return to a similar position axially on piston 14. For the form shown, ball return feature 530 is a step formed on the lower radially extending surface of an annular portion 142. Ball return feature 530 helps to keep piston 14 from tilting by ensuring balls 18 are at similar positions along wedge angle surfaces 520 and 340.

Suitable provisions are provided for anti-rotation of piston 14. As shown, generally the anti-rotation of piston 14 is a dowel pin 34. Dowel pin 34 is press fit into a hole 200 of bottom housing 10, and has a sliding fit in a hole 510 of piston 14. Those skilled in the art will recognize that the design will not deviate from the spirit and scope of the present invention if the anti-rotation provisions for piston 14 are not included.

Suitable provisions are provided to allow piston 14 to self-center. Clearances are designed into top housing 12 and bottom housing 10 to allow piston 14 to self-center in the space constrained by rotating member 36, bottom housing 10, wedge 16, and balls 18 and therefore transmit the maximum force in the most symmetric method to achieve maximum braking torque. Piston 14 has a guiding bore 500, which is guided by a guiding shaft 380 of top housing 12, to ensure excessive tilting of piston 14 does not occur. Concentricity of bottom housing 10 and top housing 12 is maintained by pilot features 230 and 430.

As shown, a center bore 170 in bottom housing 10 is maintained for clearance. Bottom housing 10 has center bore 170 concentrically located in relation to other features. Top housing 12 also has a center bore 440 concentrically located in relation to other features.

Suitable provisions are provided to close and fluidically seal both ends of piston 14 in bottom housing 10 and top housing 12. Piston 14 generally includes an axially extending annular portion 140 and annular portion 142 extending radially from the upper edge thereof. As shown, piston 14 has peripheral grooves 460, 470, and 490 designed for O-rings 26, 30, and 32 to seal chambers both in bottom housing 10 and top housing 12. Specifically, groove 470 is in an inner axially extending surface of annular portion 140, with O-ring 26 in sealing engagement with an axially extending surface formed a top housing 12. Groove 460 is in an outer axially extending surface of annular portion 140, with O-ring 30 in sealing engagement with ring 106. Groove 490 is in an outer axially extending surface of annular portion 142, with O-ring 32 in sealing engagement with an axially extending surface of guiding flange 450. A fluid chamber C is defined by top housing 12 and piston 14 between O-rings 26 and 32. The method of actuation shown in FIG. 1 is by compression springs 20, but the ability to seal chambers on either side of piston 14 allows for modularity in actuation.

Provisions for a fitting and conduit 420 allow for fluid to pressurize the chamber between top housing 12 and piston 14 and apply a force to piston 14 to compress springs 20, disengaging bottom housing 10 from contacting rotating member 36.

Suitable provisions are provided to fully seal brake B from the environment. O-rings 22 and 38 are static O-rings fit into O-ring groves 220 and 280. Rotary seal 46 is fit between the top housing 12 and rotating member 36 to dynamically seal against an outer diameter of top housing 12. Those skilled in the art will recognize that the design will not deviate from the spirit or scope of the invention if brake B is not fully sealed.

Suitable provisions are provided to allow the force exerted on top housing 12 to be transmitted to bottom housing 10. Holes 390 are machined in top housing 12 to allow for screws 24 to pass through and screw into bottom housing 10 joining clamping surfaces 300 and 410. All force, exerted by the fluid input to chamber C between top housing 12 and piston 14 to disengage brake B and axial actuation force reacted by top housing 12, is reacted by screws threads 180 in bottom housing 10.

Now that the basic construction of the brake B has been explained, a method of operation can be explained. Specifically, in normal operation of brake B, fluid is provided to the fluid chamber with sufficient pressure to move piston 14 to a hard stop on bottom housing 10, which disengages bottom housing 10 from being in contact with rotating member 36. Particularly, due to the material strength and yield, cylindrical portion 112 will push wedge 16 to a first position. When the friction facing of bottom housing 10 is disengaged from rotating member 36, no drag force is expected. Also, in normal operation, brake B will be disengaged and only in limited circumstances is brake B engaged, limiting wear of friction surface 210 on bottom housing 10.

During an emergency stop or power loss situation, brake B will engage to stop or hold rotating member 36. The fluid pressure in brake B forcing piston 14 to be in the disengaged position will be released by a control valve or solenoid. In turn, brake B will engage by the force exerted by springs 20 so that angle surface 340 interfaces with angle surface 520 to move wedge 16 to its second position radially outward of its first position and stop or hold rotating member 36 from any further motion relative to brake B.

The motion control apparatus described herein may be used as an add on module to a rotary application in need of a high torque density, zero backlash default to a lock brake or a locking device.

It should be appreciated that bottom housing 10, being fixed to stationary element 42, is a combination of an assembly housing and a friction facing in one component. The friction facing feature is a thin member defining friction surface 210 and internal diameter 260 of bottom housing 10 that deflects from its nominal position by an applied force from wedge 16 and contacts rotating member 36 to apply a normal force, which in turn is converted to a frictional force. To assist deflection, disk 110 includes a radially inward portion having a first axial thickness between face 104 and surface 250 and a radially outward portion intermediate the radially inward portion and cylindrical portion 112 of a second axial thickness less than the first axial thickness but sufficient to allow deflection of cylindrical portion 112 to engage rotating member 36. By joining the friction facing feature and assembly housing into bottom housing 10 as one fixed component, zero backlash is achieved.

Further, bottom housing 10 and wedge 16 both act as a return mechanism for the locking device by utilizing the material strength or yield of cylindrical portion 112 as a spring force. Both bottom housing 10 and wedge 16 are also utilized to preload the radial stack up in brake B to achieve a maximum facing stroke.

Additionally, when the locking device is actuated, an axial force is applied to piston 14. This axial load is multiplied and converted to a primarily radial load through wedge angle surfaces 340 and 520 in piston 14 and wedge 16. To counteract the lesser axial force, wedge 16 is captured between bottom housing 10 and top housing 12. This method of capturing wedge 16 assures near zero axial load applied to rotating member 36.

Furthermore, diametrical surfaces that interface between individual parts are designed with specific clearances that allow the locking device to self-center. Clearances are designed into the mating diameters between bottom housing 10 and stationary element 42 fixed thereto that allow brake B to self-center before fixing in place. Also, the piston 14 has specific clearances designed into the mating diameters with bottom housing 10 and top housing 12 that allow piston 14 to translate radially to center to allow for machining process variances as well as wear of components over the life of the product. This ability for brake B to self-center allows for the locking device to apply a diametrically uniform pressure which optimizes the holding torque of brake B.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Apparatus for controlling rotation comprising: a bottom housing including a disk extending radially and terminating in a cylindrical portion integrally extending axially therefrom, with the cylindrical portion including a radially outward cylindrical friction surface and a radially inward internal diameter, with circumferentially spaced slits extending radially between the friction surface and the radially inward internal diameter of the cylindrical portion and extending radially into the disk; an annular member including an internal friction facing with the annular member being rotatable relative to the bottom housing; a wedge abutting the radially inward internal diameter of the cylindrical portion, with the wedge movably supported on the disk and movable relative to the disk, parallel to the disk and perpendicular to the cylindrical portion from a first position with the cylindrical portion radially spaced from the annular member and a second position deflecting the cylindrical portion and engaging the friction surface and the friction facing together, with the disk and the cylindrical portion formed as a single fixed component from a same material having sufficient material strength and yield to allow deflection to engage the friction surface with the friction facing to hold the annular member from rotation relative to the bottom housing when the wedge is in the second position and to return the cylindrical portion to disengage from the annular member when the wedge is in the first position; and a top housing connected to the bottom housing, with the wedge located intermediate the top and bottom housings.

2. Apparatus for controlling rotation as comprising, in combination: a bottom housing including a disk extending radially and terminating in a cylindrical portion integrally extending axially therefrom, with the cylindrical portion including a radially outward cylindrical friction surface and a radially inward internal diameter, with circumferentially spaced slits extending radially between the friction surface and the radially inward internal diameter of the cylindrical portion and extending radially into the disk; an annular member including an internal friction facing with the annular member being rotatable relative to the bottom housing; a wedge abutting the radially inward internal diameter of the cylindrical portion and movable from a first position with the cylindrical portion radially spaced from the annular member and a second position deflecting the cylindrical portion and engaging the friction surface and the friction facing together, with the disk and the cylindrical portion formed as a single fixed component from a same material having sufficient material strength and yield to allow deflection to engage the friction surface with the friction facing to hold the annular member from rotation relative to the bottom housing when the wedge is in the second position and to return the cylindrical portion to disengage from the annular member when the wedge is in the first position; a top housing connected to the bottom housing, with the wedge located intermediate the top and bottom housings; a stationary element secured to the bottom housing; and a bearing having a first race sandwiched between the stationary element and the disk radially inward of the cylindrical portion and having a second race connected to the annular member.

3. Apparatus for controlling rotation comprising, in combination: a bottom housing including a disk extending radially and terminating in a cylindrical portion integrally extending axially therefrom, with the cylindrical portion including a radially outward cylindrical friction surface and a radially inward internal diameter, with circumferentially spaced slits extending radially between the friction surface and the radially inward internal diameter of the cylindrical portion and extending radially into the disk; an annular member including an internal friction facing with the annular member being rotatable relative to the bottom housing; a wedge abutting the radially inward internal diameter of the cylindrical portion and movable from a first position with the cylindrical portion radially spaced from the annular member and a second position deflecting the cylindrical portion and engaging the friction surface and the friction facing together, with the disk and the cylindrical portion formed as a single fixed component from a same material having sufficient material strength and yield to allow deflection to engage the friction surface with the friction facing to hold the annular member from rotation relative to the bottom housing when the wedge is in the second position and to return the cylindrical portion to disengage from the annular member when the wedge is in the first position; a top housing connected to the bottom housing, with the wedge located intermediate the top and bottom housings; and a rotary seal extending between the top housing and the annular member.

4. The apparatus for controlling rotation as recited in claim 2 further comprising, in combination: a dowel pin extending axially from an axial guiding flange of the top housing, with the wedge including a radially extending slot for slideably receiving the dowel pin, wherein the wedge slideably abuts with an axial surface of the disk and with the axial guiding flange of the top housing.

5. The apparatus for controlling rotation as recited in claim 4, wherein the wedge is formed of circumferentially spaced pieces, with the radially extending slot located between adjacent circumferential spaced pieces.

6. The apparatus for controlling rotation as recited in claim 5 wherein the first race abuts with an axial face of the disk, with the disk having a radially inward portion having a first axial thickness between the axial face of the disk and the axial surface of the disk, with the disk including a radially outward portion intermediate the radially inward portion and the cylindrical portion of a second axial thickness less than the first axial thickness sufficient to allow the deflection of the cylindrical portion to engage the friction surface.

7. The apparatus for controlling rotation as recited in claim 4 wherein the first race abuts with an axial face of the disk, with the disk having a radially inward portion having a first axial thickness between the axial face of the disk and the axial surface of the disk, with the disk including a radially outward portion intermediate the radially inward portion and the cylindrical portion of a second axial thickness less than the first axial thickness sufficient to allow the deflection of the cylindrical portion to engage the friction surface.

8. The apparatus for controlling rotation as recited in claim 4 further comprising, in combination: an actuator movable in an axial direction relative to the bottom housing and the wedge, with the actuator having an actuation surface which is not parallel to the axial direction, wherein an end of the wedge opposite to the cylindrical portion includes an angled surface which is not parallel to the axial direction, with the angled surface interfacing with the actuation surface for radially moving the wedge with axial movement of the actuator.

9. The apparatus for controlling rotation as recited in claim 8 further comprising, in combination: compression springs sandwiched between the bottom housing and the actuator, with the actuator located intermediate the top housing and the compression springs, with a pressure chamber defined by and between the top housing, the axial guiding flange and the actuator.

10. The apparatus for controlling rotation as recited in claim 9, wherein the top housing includes a guiding shaft including a center bore concentrically within the guiding shaft, with the pressure chamber further defined by the guiding shaft, wherein the bottom housing includes a central hub, with the central hub connected to the guiding shaft.

11. The apparatus for controlling rotation as recited in claim 10, wherein the bottom housing includes a ring axially integrally extending from the central hub, with the disk integrally extending from the ring, with the central hub including a first axial face and a shoulder located between the ring and the first axial face, with the stationary element having L-shaped cross sections having a first axially extending leg and a second leg extending radially outward of the first axially extending leg, with an end of the first axially extending leg opposite to the second leg abutting with the shoulder, with the first race abutting with the first axially extending leg and the second kg of the stationary element, the ring, and the disk, with the compression springs received in axially extending spring pockets formed in the central hub, and with a dowel pin axially extending from the central hub and slideably received in an axially extending slide hole in the actuator.

12. The apparatus for controlling rotation as recited in claim 11 further comprising, in combination: a plurality of balls rolling along the angled surface and the actuation surface to reduce friction in transmission of force between the actuator and the wedge.

13. The apparatus for controlling rotation as recited in claim 12, wherein the actuator includes an axially extending portion and an annular portion extending radially therefrom and terminating in a free end, with the free end slideably received in the axial guiding flange, with the axially extending portion being annular and slideably received between the guiding shaft and the ring, wherein a step is formed on a lower axially extending surface of the annular portion and extending axially towards the disk and positioning the plurality of balls relative to the actuation surface and the angled surface.

14. Apparatus for controlling rotation comprising, in combination: a bottom housing including a disk extending radially and terminating in a cylindrical portion integrally extending axially therefrom, with the cylindrical portion including a radially outward cylindrical friction surface and a radially inward internal diameter, with circumferentially spaced slits extending radially between the friction surface and the radially inward internal diameter of the cylindrical portion and extending radially into the disk; an annular member including an internal friction facing with the annular member being rotatable relative to the bottom housing; a wedge abutting the radially inward internal diameter of the cylindrical portion and movable from a first position with the cylindrical portion radially spaced from the annular member and a second position deflecting the cylindrical portion and engaging the friction surface and the friction facing together, with the disk and the cylindrical portion formed as a single fixed component from a same material having sufficient material strength and yield to allow deflection to engage the friction surface with the friction facing to hold the annular member from rotation relative to the bottom housing when the wedge is in the second position and to return the cylindrical portion to disengage from the annular member when the wedge is in the first position; a top housing connected to the bottom housing, with the wedge located intermediate the top and bottom housings; and an actuator movable in an axial direction relative to the bottom housing and the wedge, with the actuator having an actuation surface which is not parallel to the axial direction, wherein an end of the wedge opposite to the cylindrical portion includes an angled surface which is not parallel to the axial direction, with the angled surface interfacing with the actuation surface for radially moving the wedge with axial movement of the actuator.

15. The apparatus for controlling rotation as recited in claim 14 further comprising, in combination: compression springs sandwiched between the bottom housing and the actuator, with the top housing having an axial guiding flange, wherein the wedge slideably abuts with an axial surface of the disk and with the axial guiding flange of the top housing; with the actuator located intermediate the top housing and the compression springs, with a pressure chamber defined by and between the top housing, the axial guiding flange and the actuator.

16. The apparatus for controlling rotation as recited in claim 15 further comprising, in combination: a dowel pin extending axially from the axial guiding flange of the top housing, with the wedge including a radially extending slot for slideably receiving the dowel pin.

17. The apparatus for controlling rotation as recited in claim 16, wherein the wedge is formed of circumferentially spaced pieces, with the radially extending slot located between adjacent circumferential spaced pieces.

18. The apparatus for controlling rotation as recited in claim 15, wherein the top housing includes a guiding shaft including a center bore concentrically within the guiding shaft, with the pressure chamber further defined by the guiding shaft, wherein the bottom housing includes a central hub, with the central hub connected to the guiding shaft.

19. The apparatus for controlling rotation as recited in claim 18, wherein the bottom housing includes a ring axially integrally extending from the central hub, with the disk integrally extending from the ring, with the central hub including a first axial face and a shoulder located between the ring and the first axial face, with the stationary element having L-shaped cross sections having a first axially extending leg and a second leg extending radially outward of the first axially extending leg, with an end of the first axially extending leg opposite to the second leg abutting with the shoulder, with the first race abutting with the first and second legs of the stationary element, the ring, and the disk, with the compression springs received in axially extending spring pockets formed in the central hub, and with a dowel pin axially extending from the central hub and slideably received in an axially extending slide hole in the actuator.

20. The apparatus for controlling rotation as recited in claim 14 further comprising, in combination: a plurality of balls rolling along the angled surface and the actuation surface to reduce friction in transmission of force between the actuator and the wedge.

* * * * *